Dec. 11, 1956  C. K. F. PALM ET AL  2,773,720
STEAM VALVE WITH CLEANING FEATURE
Filed June 23, 1953

United States Patent Office 2,773,720
Patented Dec. 11, 1956

2,773,720

STEAM VALVE WITH CLEANING FEATURE

Carl Kristian Filip Palm and Erik Herbert Nylöf, Norrsundet, Sweden, assignors to Kopparfors Aktiebolag, Ockelbo, Sweden, a corporation of Sweden Application June 23, 1953, Serial No. 363,520

Claims priority, application Sweden July 1, 1952

2 Claims. (Cl. 299—59)

The invention relates to a steam valve.

In concentrating waste cellulose lye superheated steam is generally introduced directly into the lye in evaporators constructed for this purpose. However, one drawback of this method is that the steam distribution valves are easily clogged by impurities contained in the steam supplied. This is due to the fact that steam escaping from the evaporator is used again after having been passed through a superheater. Under certain circumstances such steam may contain particles of lye withdrawn and said particles may deposit as a coating on the valve members. Such a coating may also be formed on the superheated surfaces of the valve members, if the supply of steam is accidentally interrupted, in which case lye may dry on said surfaces and obstruct a further supply of steam.

The object of the invention is to provide a steam valve that will reduce this drawback. The valve comprises a pipe socket inserted through the evaporator wall at an oblique angle thereto, a rotatable spindle extending axially through the pipe socket, and a valve member formed as an elliptical disk fixed in its centre to the spindle at an angle equal to the angle between the pipe socket and said evaporator wall.

Figure 1:
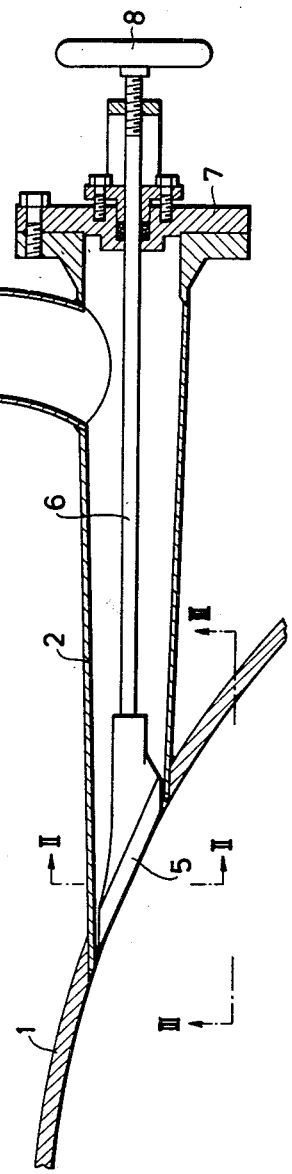
Figure 2:
Figure 3:
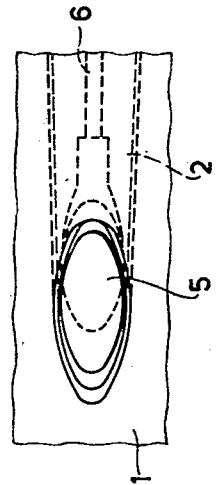

An embodiment of the valve is shown in the accompanying drawing, where Figure 1 shows a longitudinal section through the valve, while Figure 2 shows a cross section along the line II—II in Figure 1, and Figure 3 shows a view along the line III—III in Figure 1.

1 designates the cylindrical wall of an evaporator. A pipe socket 2 serving as steam nozzle is inserted through this wall. The pipe socket is tapered conically towards the wall and is directed so that its longitudinal axis forms an angle of about 30° to the tangent plane through the point where said axis crosses the wall. A branch pipe 3 extending radially from the pipe socket or the nozzle portion 2 is connected to a steam supply conduit 4 which is common to all the nozzles.

The nozzle portion 2 contains a valve member substantially shaped as an elliptical disk 5. The valve disk is fixed in its centre to the inner end of a rotatable spindle 6 extending axially through the tube 2. The mounting is such that the disk or at least its inner surface forms an angle of 30°, in this example, to the shaft, i. e. the disk may be rotated into a position as shown in Figure 1, where its inner surface lies in the plane of the inside of the wall 1. The outer portion of the spindle 6 is threaded and screwed in through a lid 7 fastened on the free end of the nozzle portion 2. The spindle is turned by means of a wheel 8 mounted on its outer end.

In the innermost position of the valve disk, as shown in Figure 1, only a small clearance exists between the disk and the surrounding inner wall of the tube 2. This clearance is dimensioned to allow a normal steam supply to the evaporator, if no impurities are deposited. If the valve should begin to clog, the disk 5 is turned outwardly by means of the wheel 8. The turning is facilitated in that the tube 2 is widened outwardly. Further, owing to the oblique position of the disk, each point on the periphery of the disk will move along a helical line, whereby the clinging material will more easily be loosened. When the valve disk has been screwed back so far that a passage for the steam is formed, the steam will blow the tube and the disk clean. Thereafter the valve disk may again be screwed into its original position.

What we claim is:

1. For use with an evaporator for waste cellulose lye having a cylindrical wall, a steam valve for supplying superheated steam to the interior of said evaporator, said valve comprising an elongated substantially cylindrical body portion adapted to merge with the wall of the evaporator at an oblique angle to communicate with an opening in the evaporator wall corresponding in cross-section to the cross-section of said body portion, a rotatable spindle extending axially through said body portion, and a valve member carried at the end of said spindle, said valve member having the form of an elliptical disk secured at its center to the spindle at an oblique angle equal to the oblique angle between the body portion and the evaporator wall, said disk normally lying in a position substantially coinciding with and smoothly merging with the plane of the evaporator wall but being dimensioned to leave a small clearance with respect to the wall of the body portion for peripheral admission of the steam and being movable into a position in which the steam sweeps the sides of the disk.

2. In an evaporator for waste cellulose lye having a cylindrical wall, in combination, a steam valve for supplying superheated steam to the interior of said evaporator, said valve comprising an elongated substantially cylindrical body portion merging with the wall of the evaporator at an oblique angle, said wall having an opening communicating with the interior of said body portion and corresponding in cross-section to the cross-section of said body portion, a rotatable spindle extending axially through said body portion, and a valve member carried at the end of said spindle, said valve member having the form of an elliptical disk secured at its center to the spindle at an oblique angle equal to the oblique angle between the body portion and the evaporator wall, said disk normally lying in a position substantially coinciding with and smoothly merging with the plane of the evaporator wall but being dimensioned to leave a small clearance with respect to the wall of the body portion for peripheral admission of the steam and being movable into a position in which the steam sweeps the sides of the disk.

References Cited in the file of this patent

UNITED STATES PATENTS

| | | |
|---|---|---|
| 1,205,619 | Hansen | Nov. 21, 1916 |
| 2,530,433 | Jaegle | Nov. 21, 1950 |
| 2,579,567 | Greene | Dec. 25, 1951 |

FOREIGN PATENTS

| | | |
|---|---|---|
| 174,955 | Switzerland | Apr. 16, 1935 |